United States Patent Office 3,407,932
Patented Oct. 29, 1968

3,407,932
DEVICE FOR THE SORTING OF ARTICLES ACCORDING TO WEIGHT
Karl-Heinz Northoff, Herford im Westphalia, Germany, assignor to Maschinenfabrik Benhil, Ellinghaus & Hilgers, Westphalia, Germany
Filed Apr. 21, 1967, Ser. No. 632,574
Claims priority, application Germany, Apr. 23, 1966, M 69,257
3 Claims. (Cl. 209—121)

ABSTRACT OF THE DISCLOSURE

Device for sorting articles by weight in which the articles are moved along an undulating guideway by carefully synchronised rotating paddle wheels. In each trough of the guideway is a balance mechanism set to a specific weight which allows an article reaching that trough to pass out of the apparatus on an individual conveyor if the article corresponds to the set weight of that mechanism. Each balance mechanism includes a locking device synchronised with the rotating paddle wheels.

---

Figure 1:
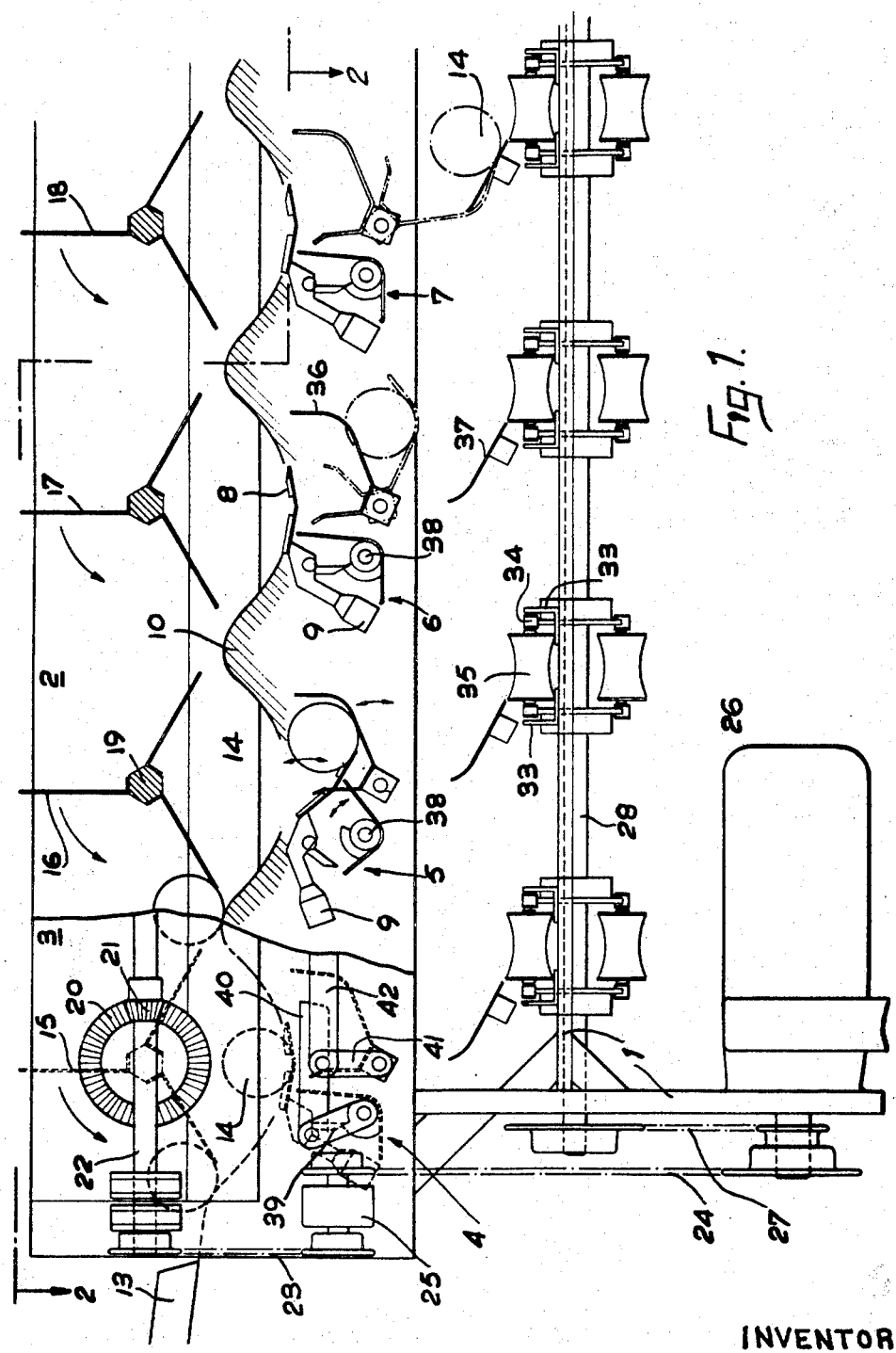

The invention relates to a device for the sorting of articles according to weight, in which the articles to be sorted are fed to a plurality of balances set to different values and are separated by these balances into similar weight classes.

Various sorting machines are known, especially for the grading of eggs, which work in the above-stated manner. Differences in their design are based mainly on the conveying means used by which transport is effected between the successive balances. Up to the present two kinds of device are in use for this purpose, consisting in the one case of lifting forks moved on circular paths and in the other of jointed bands. In both cases the eggs are lifted in cadence, after every weighing operation, from the balance pans and transferred on to the next succeeding balance, which necessarily causes an impact stressing of the eggs which, while extremely slight, is constantly recurrent. Moreover by reason of the intermittently occurring transporting actions jarring of the very sensitive balances cannot be wholly avoided, so that occasional inaccuracies in the sorting can occur.

In view of the above-explained defects of known devices it is the aim of the invention to make available a novel device which is successful in conveying the articles to be sorted without jolts over the weighing line and in preserving the balances themselves against all jarring. Moreover with constant weighing time the throughput of the machine is increased and its construction made as simple as possible.

As solution of the set problem the invention primarily proposes that the pans of the individual balances are situated in each case in the troughs of a stationary, undulatory guide path, and that above each balance a paddle wheel rotating about a horizontal axis extends into the pertinent trough of the guide path, which wheel with one of its scoops takes over the articles to be sorted out on the saddle of the guide path situated before the balance, and transports them so that firstly they slide downwards into the trough of the guide path, remain lying there in the pan of the balance for the duration of the weighing operation, and thereupon are either separated by the balance out of the conveying flow or are lifted by the next scoop of the paddle wheel up on to the saddle of the guide path lying behind the balance, where then the following paddle, moved in the same direction of rotation, becomes effective. Moreover within the scope of the invention it is favourable if the pans of the balances possess recesses or depressions by means of which the articles to be sorted always assume the same position on the balance pans during the weighing operation, and if the balances are so coupled with the drive of the paddle wheels that their balance pans are subject to a locking action before the article to be weighed is received, which locking is disengaged only as soon as the article has been released by the paddle wheel and has come to rest on the balance pan.

The progress effected by the invention in comparison with the initially described prior art is expressed above all in the fact that for the first time success is achieved in using a constantly working conveying means which both treats the articles transported by it in an extremely protective fashion and also leaves the weighing operation entirely uninfluenced. Moreover because the parts are moved only in rotation the overall construction of the machine becomes less expensive, and also an increase in its operational reliability results.

Figure 2:
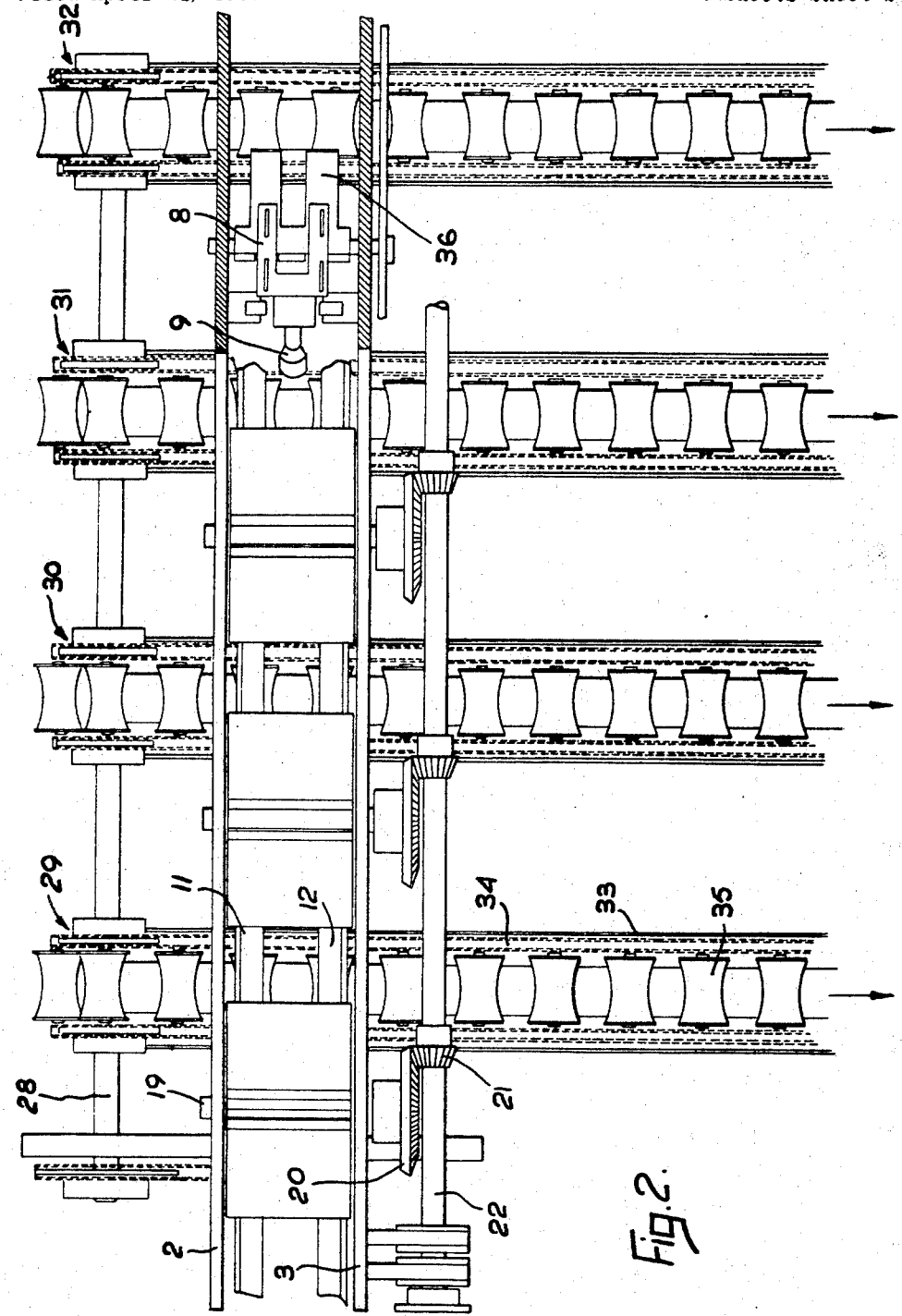

An example of embodiment of the invention will be described hereinafter with reference to the drawings, wherein:

FIGURE 1 shows the front elevation of a device according to the invention for the sorting of articles according to their weight, in partial sectional representation, and FIGURE 2 shows the plan view of the device as shown in FIGURE 1, with a section along the line 2—2.

The machine reproduced in the drawings is intended primarily for the sorting of eggs, but with slight modifications it can be used equally for fruit, vegetables, yarn spools or similar goods.

On a base frame 1 there are secured two vertical side plates 2 and 3, which receive the sorting device between them. This sorting device comprises several balances 4, 5, 6 and 7 arranged one behind the other, the number of which is determined by the number of weight classes to be considered. Each of the balances 4 to 7 consists of a balance pan 8 provided with a depression, and of a counter-weight 9, and is formed as a beam balance. Their manner of operation in the sorting operation is based on the fact that they all indicate different values, the first balance 4 being set to the highest weight in question and the further balances 5 to 7 being calibrated in decreasing order, each corresponding to one of the usual sorting groups.

The balances 4 to 7 are situated in the troughs of an undulator guide path 10 which is composed of two rails 11 and 12 firmly connected with the side plates 2 and 3. The articles 14 supplied to the sorting device by way of an entry chute 13 are transported on these rails 11 and 12 to the balance pans 8. Paddle wheels 15, 16, 17 and 18 provided above each balance 4 to 7 serve as conveying means. These wheels have their horizontal spindles 19 mounted for rotation in the side plates 2 and 3 and are set in rotation with the aid of the bevel wheels 20 and 21 by a shaft 22 extending before the side plate 3 due to the fact that this shaft 22 is driven, through chains 23 and 24 and an interposed gearing 25, by the electric motor 26 suspended on the base frame 1.

A second chain 27 emerging from the electric motor 26 leads to the shaft 28, which extends behind the side plate 2 and is intended for the drive of roller conveyors 29, 30, 31 and 32. All these roller conveyors 29 to 32 lie side by side beneath the sorting device, each of them being allocated to one of the balances 4 to 7. They consist in each case of two chains 34 lying parallel and guided in angle irons 33, between which the transport rollers 35 extend.

The roller conveyors 29 to 32 convey away the articles 14 sorted out by the balances 4 to 7, which articles are first delivered by the balance pans 8 into fork-type grippers 36. These fork-type grippers 36 are tiltably mounted in the side plates 2 and 3 and upon reception of an article 14 move downwards with the article until the latter passes on to an obliquely lying plate 37, over which it then rolls down into one of the roller conveyors 29 to 32.

The balances 4 to 7 are equipped with individual locking devices 38 connected with one another again through a linkage 39, 40. This linkage 39, 40 is controlled, by means of devices not shown in the drawings, from the shaft 22 and has the task of disengaging the locking devices 38 in a specific position of the scoop wheels 15 to 18 so as to permit the weighing action of the balances 4 to 7.

Beside the linkage 39, 40 there extends a further linkage 41, 42, which connects the fork-type grippers 36 with one another. Thus these are also controlled from the shaft 22 and move, always following upon the weighing action of the balances 4 to 7, downwards in cadence so that any articles 14 grasped by them are lowered into the roller conveyors 29 to 32.

The machine described operates as follows: the articles 14 to be sorted pass from the entry chute 13 on to the beginning of the undulatory guide path 10, where they are grasped by a scoop of the paddle wheel 15. This lets the article 14 in question slide, in the supported condition, downwards into the first trough of the guide path 10, until it comes to lie in the depression of the balance pan 8. Thereupon it is released by the paddle wheel 15, which constantly rotates, and at the same time the locking device 38 is released, so that the balance 4 comes into action. If its calibrated weight exceeds the weight of the article 14, then it remains at rest and shortly thereafter is locked again. In the mean time the paddle wheel 15 has moved into a position in which its next scoop again grasps the article 14 and lifts it as far as the saddle of the guide path 10 situated in the direction of the balance 5. Here the paddle wheel 16 takes it over to repeat the operation just described, so that the article 14 is now supplied to the balance 5. This time its weight is assumed to correspond, according to the operating condition as illustrated, to the setting of the balance 5, so that the balance pan 8 sinks and passes the article 14 on to the fork-shaped gripper 36, which in turn supplies it to the roller conveyor 30. If again in the case of the balance 5 the weight of the article 14 were not sufficient to cause its balance pan 8 to sink, then the article 14 would have to be transported further to the balance 6, and possibly even to the balance 7.

All the articles 14 collecting on the roller conveyors 29 to 32 pertain in each case to one common weight class which correspondds to the setting of the pertinent balance 4, 5, 6 or 7. The roller conveyor 29 here receives the articles 14 with the greatest weight and the roller conveyor 32 those with the least weight. Should there also be among the articles 14 to be sorted some which are not heavy enough to depress the balance pan 8 of the balance 7, then these articles 14 are lifted away even over the last saddle of the guide path 10 by the scoop wheel 18, whence they roll down then into a special container (not shown).

What I claim as new and desire to secure by Letters Patent of the United States is:

1. A device for sorting articles by weight comprising an undulating guideway consisting of a succession of troughs and saddles, a plurality of balance mechanisms, each having a balance pan and set to respond to a different weight, a plurality of exit conveyors, a plurality of rotatable paddle wheel devices with paddle members thereon, and drive means for the paddle wheel device, one balance mechanism being arranged at each trough of the guideway with its balance pan forming a continuation of the guideway, one paddle wheel device being positioned also to correspond with each trough of the guideway and arranged to progress an article to be sorted along the guideway by allowing it to slide down into the first trough behind one paddle member onto the balance pan situated there, allowing it to lie there while it is weighed and then pushing it up from the trough with the next succeeding paddle member onto the next saddle where it is received by the paddle wheel device corresponding to the next trough, an exit conveyor being arranged beneath each balance mechanism to receive any article to which that mechanism responds.

2. Device according to claim 1, wherein the balance pans of the balance mechanisms possess recesses or depressions by means of which the articles to be sorted always assume the same position on the balance pans during the weighing operation.

3. Device according to claim 1, wherein the balance mechanisms are so coupled with the drive means that their balance pans, before the reception of the article to be weighed are subject to a locking which is released only when the article has been released by the paddle wheel device and has come to rest on the balance pan.

References Cited

UNITED STATES PATENTS 2,279,947    4/1942    Keen _____ 209—121
3,349,907   10/1967    Niederer _____ 209—121

M. HENSON WOOD, JR., *Primary Examiner.*

R. A. SCHACHER, *Assistant Examiner.*